May 12, 1925.                    1,537,827
J. E. JOHNSON
STRAINER
Filed July 21, 1922

J. E. Johnson
INVENTOR
BY Victor J. Evans
ATTORNEY

WITNESSES

Patented May 12, 1925.

1,537,827

UNITED STATES PATENT OFFICE.

JOHN E. JOHNSON, OF WASHINGTON, DISTRICT OF COLUMBIA.

STRAINER.

Application filed July 21, 1922. Serial No. 576,609.

*To all whom it may concern:*

Be it known that I, JOHN E. JOHNSON, a citizen of the United States, residing at Washington, in the District of Columbia, have invented new and useful Improvements in Strainers, of which the following is a specification.

This invention relates to improvements in strainers especially designed for straining milk, or similar liquids.

An object of the present invention is the provision of a strainer wherein the liquid passing therethrough is subjected to a double straining operation, the second operation acting to prevent the passage of any extraneous substances, which might escape through the first straining operation.

Another object of the invention is the provision of a novel form of supplemental strainer, which will permit of the free passage of liquid, but will prevent the passage of any other matter.

Another object of the invention is the provision of a strainer as above stated, which may be a part of a strainer of the ordinary type, such as the usual funnel strainer, the invention being capable of removable attachment to a strainer of this character, which will permit of the said strainer being thoroughly cleaned and kept in a sanitary condition.

With the above and other objects in view, the invention further includes the following novel features and details of construction, to be hereinafter more fully described, illustrated in the accompanying drawings and pointed out in the appended claim.

In the drawings:—

Figure 1:
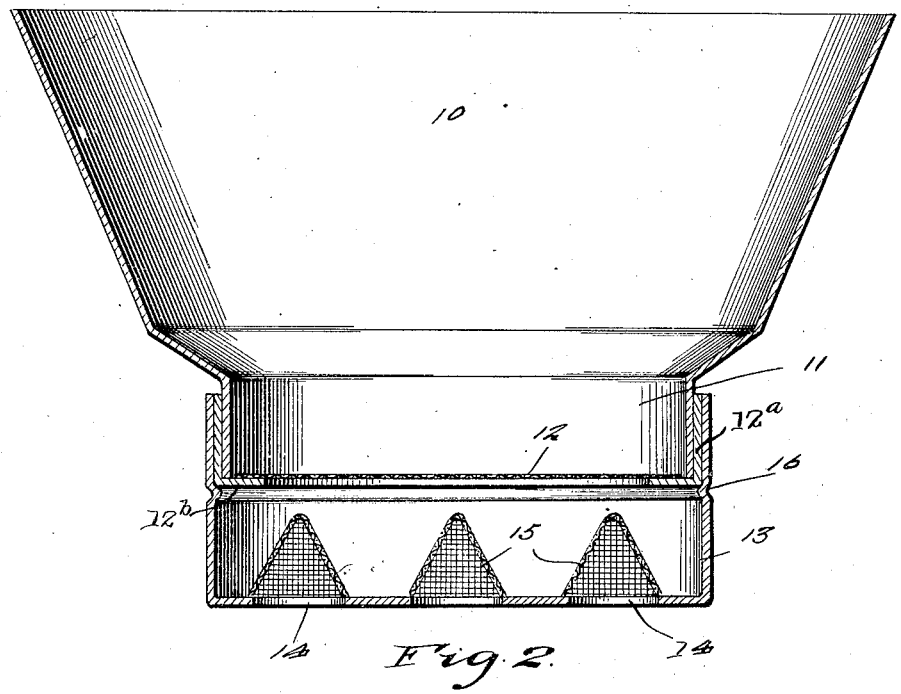
Figure 1 is a sectional view illustrating the invention.
Figure 2:
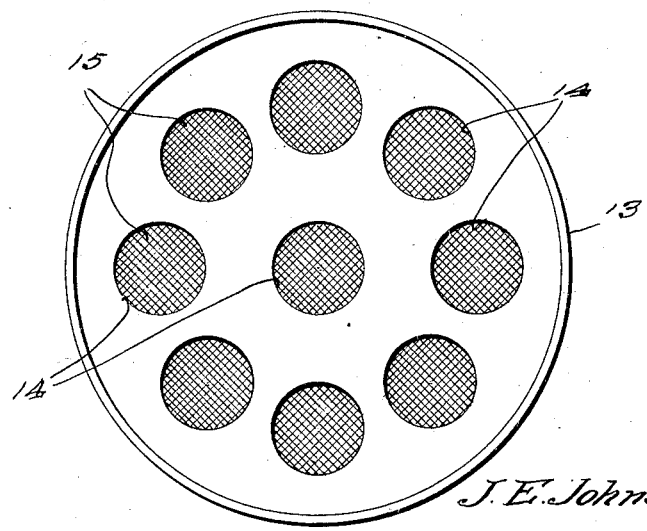
Figure 2 is a plan view of the attachment per se.

Referring in detail to the drawings, wherein like characters of reference denote corresponding parts, the reference character 10 indicates a strainer of ordinary form, which includes a funnel-shaped member having a cylindrical lower end 11, which is open for the passage of liquid, an annular flange 12ª, being substantially L-shaped in cross-section and including a bottom wall or support 12ᵇ. The opening provided by the wall or support 12ᵇ is covered by a foraminous covering 12, which may be either of cloth or wire fabric, as is usual in strainers of this character.

Frequently, in the straining of milk, small particles of dirt or other extraneous matter will pass through the fabric 12 and will remain in the strained milk. To prevent this, the present invention provides a supplemental strainer which is indicated generally at 13 and which may be removably secured, as by frictional engagement, to the cylindrical portion 11 of the strainer 10.

This supplemental strainer comprises a cup-shaped member, whose bottom is provided with perforations 14, which are closed by cloth or screen fabric covering, the latter extending upwardly and inwardly from the openings 14 so as to provide inclined or deflecting surfaces. For this purpose, these opening coverings 15 are of conical formation, so that when the particles of dirt or the like pass through the fabric 12 and fall upon the coverings 15, the inclined sides of the latter will deflect the dirt downward into the bottom of the strainer 13, while free passage of the milk or other liquid through the coverings will be permitted. The supplemental strainer 13 is frictionally engaged with the cylindrical portion of the annular flange 12ª and may be easily removed so as to permit of the strainer being throughly cleaned and kept in a sanitary condition. The strainer 13 is preferably provided with an inwardly extending annular bead 16 to engage the lower edge 12ᵇ of the wall 12ª and act as a stop.

The invention is susceptible of various changes in its form, proportions and minor details of construction and the right is herein reserved to make such changes as properly fall within the scope of the appended claim.

Having described the invention what is claimed is:—

A strainer of the character described comprising an open lower cylindrical portion, an annular flange having an upstanding wall and a narrow inwardly extending support, the lower reduced cylindrical portion of the strainer being received within the annular flange and supported by the inwardly extending support, a foraminous covering supported by the annular flange and closing the opening defined by same and a cup-shaped member having a plurality of strainer elements in the bottom thereof, and having a head formed intermediately thereof to receive and engage the lower edge of the annular flange when the same is inserted in the cup-shaped member.

In testimony whereof I affix my signature.

JOHN E. JOHNSON.